Aug. 13, 1957     O. S. GREGORY ET AL     2,802,676
SAFETY AUXILIARY COUPLING DEVICE FOR TRACTOR TRAILER
Filed Sept. 1, 1954
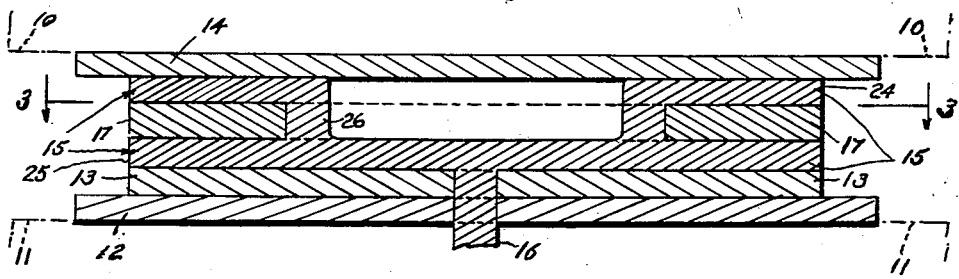
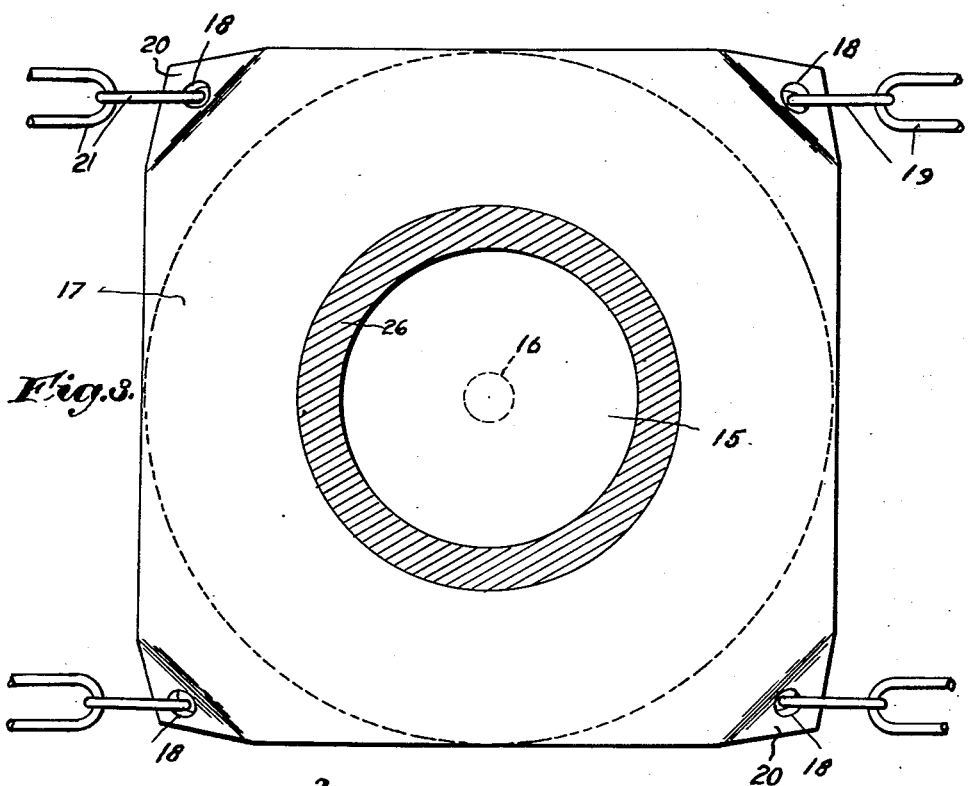
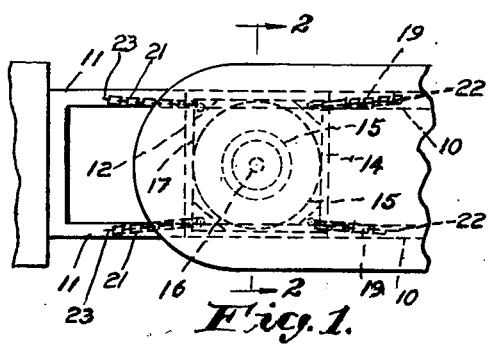
INVENTORS.
Leonard A. Gregory,
BY Oscar S. Gregory.
James C. Hamilton,
Atty.

2,802,676

SAFETY AUXILIARY COUPLING DEVICE FOR TRACTOR TRAILER

Oscar S. Gregory, Carmichael, and Leonard A. Gregory, Yuba City, Calif., assignors of thirty-three and one-third percent to Marshall S. Bliss and Clema Bliss, as joint tenants Application September 1, 1954, Serial No. 453,564

2 Claims. (Cl. 280—432)

Our present invention relates to safety devices and more particularly to safety devices for automobile tractor trailers.

It is a well recognized fact with automotive transport companies that a real hazard exists in the use of trailers, the damaged equipment and cargo running into many thousands of dollars yearly.

This failure of equipment referred to is often due to breaking of the king-pin which connects the trailer to the tractor. The breaking of this pin may be due to many causes. Many failures of the pin are due to crystallization of the pin metal.

In breakdowns of this nature the death of the driver may result as in the case of collisions or other sudden stops. The snapping of the king-pin permits the front end of the trailer to ram and telescope into the tractor when the tractor is traveling at high speeds. Many fatal accidents to both the driver and other motor vehicle drivers on the same road have been due to failure of this part of the trailer equipment.

The principal object of our invention is to provide a device which will hold the trailer to the tractor in a secure manner should the pivot or king-pin break or otherwise fail to serve its purpose.

Another object of the invention is to provide a safety device as above stated which not only holds the trailer to the tractor on failure of the king-pin but at the same time permits the trailer king-pin to pivot freely as though the device was not present, when the vehicles are making a turn, etc.

Other objects and novel features comprising the construction and arrangement of our safety device will be more apparent in the following description.

In the drawings illustrating the preferred embodiment of our invention:

Figure 1 is a diagrammatic fragmentary plan view of the tractor, trailer and device.

Fig. 2 is an enlarged cross-section of the device taken on line 2—2 of Fig. 1.

Fig. 3 is a plan cross-section taken on line 3—3 of Fig. 2.

Referring more in detail to the drawings, 11 indicates the frame of the tractor and 10 indicates the frame of the trailer. Attached to the tractor frame 11 is a plate 12 upon which is located a lower turn-table plate 13. Attached to the frame 10 of the trailer is a plate 14. Attached to the plate 14 is a turn-table plate 15 the central portion of which carries a king-pin 16. These turn-tables are large, approximately thirty-six inches in diameter and are made up of heavy steel plate. The upper turn-table member 15 may be made of several pieces such as upper plate 24 and lower plate 25 with an annulus 26 welded therebetween. A free turning square plate 17 is journaled in the plate 15 and is free to rotate 360 degrees. The corners 20 of the square plate 17 are downturned and provided with holes 18 through which are secured rear chains 19 and front chains 21. The opposite ends of the chains 19 and 21 are secured to frames of the tractor and the trailer respectively as indicated in Fig. 1 at 22 and 23 respectively. Any manner of attaching the chains to the vehicles may be used, such as hooks, etc. The chains 19 and 21 are long enough so that there will normally be sufficient slack in order that the tractor 10 can freely turn relative to the trailer 11 in the normal steering and driving operations.

In actual practice the turn-table plate 13 which is secured to the tractor frame 11 is provided with automatic coupling mechanism which permits the coupling of the king-pin in a horizontal direction the pin being locked in place. This portion of the equipment has no bearing on the present invention and is therefore not shown or described.

In operation, the square plate rotates freely when the turn-tables are pivoting as in a turning movement on a road.

Should the king-pin 16 snap or otherwise be disengaged with a fixed portion of the tractor the trailer cannot surge forward against the tractor or become disengaged in the opposite direction.

While we have shown and described our invention somewhat in detail yet it is to be understood that we may vary the shape and proportions and use equivalent structure within wide limits while still keeping within the spirit of the appended claims.

Having thus described our invention what we claim as new is:

1. A safety coupling device between a tractor and trailer, comprising a lower stationary plate secured to the tractor frame, a lower turn-table plate resting on said lower plate, and said lower stationary plate and lower turn-table plate having aligning openings, an upper turn-table plate embodying spaced upper and lower plate members resting on said lower turn-table plate, an annulus fixed between said upper and lower plate members, a king-pin depending from said upper turn-table plate disposed in said aligning openings, a free turning plate disposed in the space between the upper and lower plate members and engaging about said annulus, a plate connected to said trailer frame secured to said upper turn-table plate, a pair of chains connected between said free-turning plate and tractor frame, and a pair of chains connected between said free turning plate and trailer frame.

2. The subject matter as claimed in claim 1, and said free-turning plate being of rectangular construction, the corners of said free-turning plate extending downwardly and apertured, chains connected within the apertures of the down-turned corners of said free-turning plate, said chains providing a connection between said free-turning plate, tractor and trailer.

References Cited in the file of this patent
UNITED STATES PATENTS

| 1,479,828 | Morrison | Jan. 8, 1924 |
| 2,069,928 | Runyan | Feb. 9, 1937 |
| 2,625,406 | Black | Jan. 13, 1953 |